United States Patent [19]

Schrenk

[11] Patent Number: 6,095,411
[45] Date of Patent: Aug. 1, 2000

[54] ELECTRONIC DEBIT CARD AND METHOD FOR RECHARGING AN ELECTRONIC DEBIT CARD

[75] Inventor: Hartmut Schrenk, Haar, Germany

[73] Assignee: Siemens Aktiengesellschaft, Munich, Germany

[21] Appl. No.: 08/953,966

[22] Filed: Oct. 20, 1997

Related U.S. Application Data

[63] Continuation of application No. PCT/EP96/01521, Apr. 9, 1996.

[30] Foreign Application Priority Data

Apr. 20, 1995 [EP] European Pat. Off. ............ 95 105 932

[51] Int. Cl.$^7$ .............................. G06K 5/00; G06K 17/60
[52] U.S. Cl. ......................... 235/380; 235/379; 235/382; 235/492
[58] Field of Search .................................. 235/379, 380, 235/382, 385, 492, 375

[56] References Cited

U.S. PATENT DOCUMENTS

| | | | |
|---|---|---|---|
| 4,204,113 | 5/1980 | Giraud et al. | 235/380 |
| 4,853,526 | 8/1989 | Effing | 235/492 |
| 4,970,675 | 11/1990 | Gallay et al. | 364/757 |
| 5,033,021 | 7/1991 | Barakat | 364/900 |
| 5,089,959 | 2/1992 | Hasard | 235/375 |
| 5,264,689 | 11/1993 | Maes et al. | 235/492 |
| 5,285,415 | 2/1994 | Depret et al. | 235/379 |
| 5,495,098 | 2/1996 | Pailles et al. | 235/492 |

FOREIGN PATENT DOCUMENTS

| | | |
|---|---|---|
| 0345108A1 | 12/1989 | European Pat. Off. . |
| 0378454A1 | 7/1990 | European Pat. Off. . |
| 0519847A1 | 12/1992 | European Pat. Off. . |
| 0646892A2 | 4/1995 | European Pat. Off. . |
| 2608809 | 6/1988 | France . |

*Primary Examiner*—Donald Hajec
*Assistant Examiner*—Daniel St. Cyr
*Attorney, Agent, or Firm*—Herbert L. Lerner; Laurence A. Greenberg

[57] ABSTRACT

An electronic debit card and a method for recharging the debit card include an integrated semiconductor circuit device having at least one address and control logic circuit and a non-volatile memory. At least one part of the non-volatile memory is erasable, and memory locations of the region, provided for storing respective value units of the debit card, of the non-volatile memory each being divided up into subregions of different significance. Erasure of the memory locations is possible simultaneously only for all of the memory locations of a subregion of specific significance. Each subregion is capable of erasure only after a carry value has been written into a previously empty memory location of the subregion of the next highest significance. The value units of at least the memory locations of the most significant subregion in a release register of the debit card are assigned release values to be stored, which represent either a release state or a blocking state for the respectively assigned value state of the memory locations of the at least most significant subregion, and raising the card value of the debit card is possible only by changing a release value assigned to the value state of a memory location, from the blocking state into a release state.

15 Claims, 2 Drawing Sheets

| Stage | Value counter | Value stage | Release counter |
|---|---|---|---|
| | bit 9 8 7 6 5 4 3 2 1 0 | | bit 9 8 7 6 5 4 3 2 1 0 |
| 5 | 1 1 1 1 1 1 1 1 1 1 | $8^4 = 4096$ | 1 1 1 1 1 1 1 1 0 0 |
| 4 | 1 1 1 0 0 0 0 0 | $8^3 = 512$ | |
| 3 | 1 1 1 1 0 0 0 0 | $8^2 = 64$ | |
| 2 | 1 1 0 0 0 0 0 0 | $8^1 = 8$ | |
| 1 | 0 0 0 0 0 0 0 0 | $8^0 = 1$ | |

Fig. 1

| Stage | Value counter (bit 7 6 5 4 3 2 1 0) | Significance |
|---|---|---|
| 1 | 0 0 0 0 0 0 0 0 | $8^4 = 4096$ |
| 2 | 1 1 0 0 0 0 0 0 | $8^3 = 512$ |
| 3 | 1 1 0 0 0 0 0 0 | $8^2 = 64$ |
| 4 | 1 1 1 1 1 0 0 0 | $8^1 = 8$ |
| 5 | 0 0 0 0 0 0 0 0 | $8^0 = 1$ |

Fig. 2.1

| Stage | Value counter (bit 9 8 7 6 5 4 3 2 1 0) | Value stage | Release counter (bit 9 8 7 6 5 4 3 2 1 0) |
|---|---|---|---|
| 5 | 1 1 1 1 1 1 1 1 1 1 | $8^4 = 4096$ | 1 1 1 1 1 1 1 1 0 0 |
| 4 | _ _ 1 1 0 0 0 0 0 0 | $8^3 = 512$ | |
| 3 | _ _ 1 1 1 1 0 0 0 0 | $8^2 = 64$ | |
| 2 | _ _ 1 1 0 0 0 0 0 0 | $8^1 = 8$ | |
| 1 | _ _ 0 0 0 0 1 0 0 0 | $8^0 = 1$ | |

Fig. 2.2

| Stage | Value counter (bit 9 8 7 6 5 4 3 2 1 0) | Value stage | Release counter (bit 9 8 7 6 5 4 3 2 1 0) |
|---|---|---|---|
| 5 | 1 1 1 1 1 1 1 0 0 0 | $8^4 = 4096$ | 1 1 1 1 1 1 1 1 0 0 |
| 4 | _ _ 0 0 0 0 0 0 0 0 | $8^3 = 512$ | |
| 3 | _ _ 0 0 0 0 0 0 0 0 | $8^2 = 64$ | |
| 2 | _ _ 1 1 1 1 1 1 0 0 | $8^1 = 8$ | |
| 1 | _ _ 1 1 0 0 0 0 0 0 | $8^0 = 1$ | |

Fig. 2.3

| Stage | Value counter (bit 9 8 7 6 5 4 3 2 1 0) | Value stage | Release counter (bit 9 8 7 6 5 4 3 2 1 0) |
|---|---|---|---|
| 5 | 1 1 1 1 1 1 1 0 0 0 | $8^4 = 4096$ | 1 1 1 1 1 1 0 0 0 0 |
| 4 | _ _ 0 0 0 0 0 0 0 0 | $8^3 = 512$ | |
| 3 | _ _ 0 0 0 0 0 0 0 0 | $8^2 = 64$ | |
| 2 | _ _ 1 1 1 1 1 0 0 0 | $8^1 = 8$ | |
| 1 | _ _ 0 0 0 0 0 0 0 0 | $8^0 = 1$ | |

ELECTRONIC DEBIT CARD AND METHOD FOR RECHARGING AN ELECTRONIC DEBIT CARD

CROSS-REFERENCE TO RELATED APPLICATION

This application is a continuation of International Application Serial No. PCT/EP96/01521, filed Apr. 9, 1996.

BACKGROUND OF THE INVENTION

Field of the Invention

The invention relates to a method for recharging an electronic debit card for cashless clearing or payment transactions including an integrated semiconductor circuit device having at least one address and control logic circuit and a non-volatile memory, at least one part of the non-volatile memory being erasable, and the memory locations of the region, provided for storing the respective value units of the debit card, of the non-volatile memory being divided up into subregions of different significance in each case, erasure of the memory locations being possible simultaneously only for all of the memory locations of a subregion of specific significance, and each subregion being capable of erasure only after a carry value has been written into a previously empty memory location of the subregion of the next highest significance. The invention also relates to an electronic debit card for cashless clearing or payment transactions having an integrated semiconductor circuit device for carrying out the method.

Data-controlled payment systems which are known for the purpose of cashless payment for goods or for the purpose of settlement for services and the like are in the form of data exchange systems in which the debit cards used therein include a non-volatile electronic data memory as an essential element which can be accessed through electric contacts on the card surface. A data input or data output device (point-of-sale terminal) is used by an arithmetic unit to access the memory contents with each use, and the memory contents is changed, if appropriate. Especially in the case of the use of prepaid data carrier configurations, permitting anonymous payment for goods or chargeable services, it must be ensured that the value of the card can only be reduced but not raised by tampering.

Rechargeable debit cards have so far been realized predominantly as processor cards, since the higher computing power of a microprocessor has simplified monitoring of the recharging. However, intelligent memory cards are being increasingly used in low-end payment systems, in particular in prepaid cards. The chip card presently being used by the firm Siemens shows that cryptological authenticity and authorization checks of the participants in payment operations can presently also be realized on a comparable security level through the use of memory chips. However, electronic monitoring of the transferred money amounts through the use of the methods realized by microprocessors would make such cards too expensive.

It is to be assumed in principle in the case of rechargeable debit cards, both on a microprocessor basis and on a memory basis, that not only is a system secret present, but a crypto-algorithm for authenticity checks as well. Nevertheless, various risks are to be considered.

On one hand, even after electronic authentication of the partners participating in recharging, tampering with the book value of the debit card by a thief tampering with the transmitted data cannot be excluded. Moreover, the booking operation is made up of an erase/write cycle of the non-volatile counting region, in which the debit card can temporarily even assume a higher monetary value. An interruption of the charging process at a suitable instant would then lead to an unjustifiably high market value. In that case an erase/write cycle is composed of two operations: firstly, erasing the full counter or subregions of the counter, and thereafter setting or entering the new counter reading. In that case, by definition erasure is the operation in which a relatively large number of information words (bits) are changed in the same sense on memory locations. It is not until writing that the desired specific bit pattern is subsequently generated. For technical security reasons, devaluation by writing individual bits must be the electric discharging operation of memory locations, so that the market value can only decrease in any spontaneous discharge of the cells. Erasure is thus the risky, value-raising operation. In the period between erasing and writing, the counter temporarily assumes a maximum value as an intermediate state which is not recorrected until the writing operations. In the case of the known chip card, the tampering risk resides in that unavoidable intermediate state.

SUMMARY OF THE INVENTION

It is accordingly an object of the invention to provide an electronic debit card and a method for recharging an electronic debit card, which overcome the hereinafore-mentioned disadvantages of the heretofore-known devices and methods of this general type and which render it possible to recharge with an arbitrary market value in a manner secure against tampering in conjunction with a comparatively low additional outlay, while at the same time preserving in essence the presently employed concepts of chip cards.

With the foregoing and other objects in view there is provided, in accordance with the invention, a method for recharging an electronic debit card for cashless clearing or payment transactions, which comprises providing an integrated semiconductor circuit device with at least one address and control logic circuit and a non-volatile memory; providing the non-volatile memory with at least one erasable part and a region with memory locations for storing respective debit card value units, each divided into subregions of different significance; simultaneously erasing the memory locations only for all of the memory locations of a subregion of specific significance; erasing each subregion only after writing a carry value into a previously empty memory location of a subregion of next highest significance; assigning release values to be stored to the value units of at least the memory locations of the most significant subregion in a debit card release register; representing with the release values a release state or a blocking state for the respectively assigned value unit of the memory locations of the at least most significant subregion; and raising a total value of the debit card only by changing the release value assigned to the value unit of a memory location, from the blocking state into the release state.

The invention is initially based on the finding that new value units on the debit card are not actually reloaded in the physical sense, but are merely released by introducing a release value which is to be written independently. In this way, it is possible to provide recharging which is protected against tampering, specifically through the use of a merely slight additional outlay, while preserving the essential concepts of the memory cards employed to date. At no time does the debit card reach a raised monetary value in the release phase. The concept of secure internal reloading of the security counter is also co-used for reloading. The critical operation of erasure is not even carried out during the actual recharging and is excluded from charging. Only writing is performed during recharging.

Following the principle of the invention, the value counter of the debit card is extended in counting range in the chargeable electronic debit card by at least one release register in such a way that it determines the sum of all of the possible chargings. The release register initially provided in the debit card does not require excessively many additional memory locations, since it is initially only the most significant bits in the value counters which are involved, and the latter individually respectively contain many value units. In the charging terminal, the value units of the enlarged value counter are only released for debiting by writing operations or, in other words, by being booked in the value counter. Subsequently, the released value units permit the carrying out within the value counter of rebooking operations which are neutral as to value, are only occasioned in the point-of-sale terminal during debiting and utilize the trustworthy tamperproofness of a security counter in a debit card without additional risk.

In accordance with another mode of the invention, the release, rendered possible on the basis of the release value written in the release register, of an assigned value unit is used in the subregion of the memory locations of a specific significance to erase the subregion of the next lowest significance.

In accordance with a further mode of the invention, the recharging of the debit card is carried out in this case by a writing operation for one or more release values in the release register for the purpose of releasing the assigned value units in a subregion of the memory.

In accordance with an added mode of the invention, the writing of a value unit in a subregion of the memory, and thus the consumption of a monetary value to be recharged, is not rendered possible until an assigned release value has been written in the release register.

In accordance with an additional mode of the invention, the charging of the debit card is carried out in a charging terminal in predetermined increments or multiples thereof in accordance with the significance of the value stage which is situated directly therebelow with reference to the most significant value stage and is to be erased.

In accordance with yet another mode of the invention, the security-relevant charging operation of the debit card contains only value-diminishing writing operations or rebookings which are neutral as to value, and an authenticity check of the debit card is undertaken in the charging terminal before a value unit is released.

The point-of-sale terminal in this case transmits to the debit card a freely selectable challenge and the response thereto calculated with the knowledge of a common secret. The debit card internally compares the response transmitted by the point-of-sale terminal with the self-calculated value. In the case of agreement, one bit is respectively released in the release register through the use of chip-internal logic without additional external data transmission. There is no possibility of externally influencing the charging amount. In the case of agreement, one bit is released in each case in the release register through the use of chip-internal logic without additional external data transmission. There is no possibility of externally influencing the charging amount. The entire security check can be safeguarded during recharging by (mutual) authentication through the use of a reliable cryptological one-way function.

The security-critical erasing operation of the charge is integrated as a rebooking operation into the debiting operation at the point-of-sale terminal. The takeover of a residual value of the debit card from the state before charging follows of itself from the concept, because the released units in the value counter are added to the previous reading of the value counter without additional outlay.

According to an embodiment of the invention, the total card value due to the charging can be fixed at a minimum value by the value of a bit in the release register. The tamper-protected charging by arbitrarily adjustable, relatively large monetary values is possible in this case only starting from a release of two bits in the release register, because only then can the required rechargings in the value counter be carried out under all residual value conditions using a first release bit, and at the same time the card in this case is still in a less significant state.

If the charging values are smaller than two value bits in the release register, it is possible that in the case of only one release bit the value adjustment in the value counter can be carried out only after the release of the bit in the release register, and is thus less well protected. A thief or swindler could then theoretically advantageously remove the debit card from the charging terminal before termination of the value adjustment.

In accordance with yet a further mode of the invention, the risk of fraud in the case of relatively small charging amounts can be eliminated by an additional, non-volatile backup bit inside the debit logic of the debit card, which operates in a manner analogous to a backup logic in the value counter of the debit card: it is written, for example, at the same time as the release bit.

In accordance with yet an added mode of the invention, the additional, non-volatile backup bit is reset through the charging terminal after terminating the devaluation operation by a security procedure similar to that during writing of a release bit. The backup bit remains set in the case of fraudulent termination, with the result that this debit card will be detected and rejected in every case by routine checking in the point of-sale terminal.

If very many, small charging amounts are permitted, it can be necessary to configure the value counter in such a way that the fraction of the control region at the value counter is enlarged and the remaining value memory is correspondingly reduced. However, in every case the unlimited secure setting of arbitrary charging amounts always presupposes a minimum charging amount corresponding to two bits in the release register. In contrast, in this counter configuration the maximum rise in value per charging is advantageously not limited. If the entire counting volume of the value counter is to be distributed over very many, small charging units which, in turn, are to be charged very frequently, the control region and the assigned release region could also again themselves be constructed as (octal) counters. In this case, however, the maximum amount which can be released in a single charging operation by writing a plurality of release bits in the value counter is also subject to additional limitations. To be specific, in the case of value-neutral recharging inside the upper counting regions, the direct assignment of the bits in the release register (changed in the charging terminal) and in the value counter (changed in the point-of-sale terminal) can be lost, with the result that the owner cannot actually consume the full charging value. These limitations in the maximum amount in the case of a single charging operation can be eliminated, in turn, by an additional flag control, with this counting configuration being likely to be of interest only essentially for special counting requirements.

According to a preferred embodiment of a debit card according to the invention, it can be provided that before the devaluation of a bit in the control region of the value counter it is checked internally on the chip not only whether or not the additional bit is still erased "1", but also whether or not the assigned release bit has the release state "0". In this case, it can be provided in a simple embodiment that the two memory areas are assigned independent read-out circuits with separate column decoders, in order to avoid a comparatively complicated serial interrogation of the two counters. Moreover, it is expedient for a value counter including the control region, on one hand, and a release register, on the other hand, to be operated with a different weighting voltage at the control gate of the memory cells. As was already mentioned, the value counter must be constructed in such a way that the discharged state of the EEPROM cells also corresponds to the neutral, written and devalued state. In contrast, writing in the release register does not devalue but raises the value. It is therefore advantageously constructed, by selecting a lower gate voltage, in such a way that a memory cell which has fallen back due to a stress into the neutral state is evaluated as "1" or not released (that is to say the definition employed of erased= logic "1" is advantageously retained).

With the objects of the invention in view there is also provided an electronic debit card for cashless clearing or payment transactions, comprising an integrated semiconductor circuit device including at least one address and control logic circuit and a non-volatile memory; the non-volatile memory having at least one erasable part, and the non-volatile memory having a region with memory locations for storing a respective devaluation state of the debit card, each divided into subregions of different significance; the memory locations capable of simultaneous erasure only for all of the memory locations of one of the subregions of specific significance; each subregion capable of erasure only after writing a carry value into a previously empty memory cell of the subregion of next highest significance; at least the memory locations of the most significant subregion in a release register having value units assigned release values to be stored; the release values representing a release state or a blocking state for the respectively assigned value unit of the memory locations of the at least most significant subregion; and the semiconductor circuit device permitting a total value of the debit card to be raised only by changing the release value assigned to the value unit of a memory location, from the blocking state into the release state.

In accordance with another feature of the invention, there is provided a substantially identically constructed duplicate of the release register associated with or connected upstream of the memory locations at least of the most significant subregion of the memory.

In accordance with a further feature of the invention, an amount of the memory locations of the most significant subregion of the memory limits a sum of all payment operations including chargings permitted for a debit card.

In accordance with an added feature of the invention, at least the region of the non-volatile memory for storing the respective devaluation state of the debit card is a multistage counter.

In accordance with an additional feature of the invention, the multistage counter is an octal counter.

In accordance with a concomitant feature of the invention, at least the region of the non-volatile memory for storing the respective devaluation state of the debit card has an electrically erasable read-only memory.

Other features which are considered as characteristic for the invention are set forth in the appended claims.

Although the invention is illustrated and described herein as embodied in an electronic debit card and a method for recharging the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic representation of a basic principle of a security counter in a conventional memory card;

FIGS. 2.1 to 2.3 are diagrammatic representations of a principle of charging by releasing residual amounts accompanied by residual value acceptance, according to the invention; and FIGS. 3.1 to 3.5 are diagrammatic representations of charging accompanied by release and recharging of a value counter in the case of recharging of the debit card with 10000 value units.

DESCRIPTION OF THE PREFERRED EMBODIMENTS

Referring now to the figures of the drawings in detail and first, particularly, to FIG. 1 thereof, there is seen a diagrammatic representation of a functional principle of a modern, prepaid card which is not renewed after complete consumption of a market value. The debiting operation, for example in a prepaid telephone chip card, is realized as a rule through the use of a security counter as an "electronic abacus", for example by the method described in European Patent 0 321 727 B1. A non-volatile value counter is electronically safeguarded against the possibility of its value ever being raised by the programming processes. Conventional binary counters, in which bits have to be erased and written continuously, are excluded as value counters.

In accordance with FIG. 1, the counting configuration used in the card includes a value counter with five stages each having 8 EEPROM cells which are interconnected as octal counters. Each stage is assigned a fixed significance. In neighboring value stages in the octal counter, a bit of the higher-order stage has 8 times the significance of a bit of the respective stage situated therebelow. The bits of the five 8-bit stages are respectively assigned the value units 1, 8, 64, 512 and 4096 in telephone cards. For example, in the numerical example in accordance with FIG. 1, an appropriate counter reading is set $(1,200=2*512+2*64+6*8)$ in the case of the initialization of a $12.00 card (=1,200 value units). It is understood that any currency, such as Marks may be used instead of Dollars. As a rule, the theoretical, maximum counting range of the card of $8^5=32768$ units is not utilized, and therefore not a single bit is situated in the uppermost counting stage 5 in the given example. The counter bits are erased before the devaluation and, in accordance with the definition presently used, have the logic state "1". In order to devalue, the due amount is divided between five counter stages, and the relevant number of bits is devalued by writing from "1" to "0". The lower four value stages 1 to 4 are constructed as EEPROMs, and the uppermost stage 5 as a PROM. If all of the bits of a lower value stage are consumed, it is necessary to insert an internal rebooking operation through the terminal before further debiting operations. In those operations the 8 full bits of a stage are re-erased after "1" after an erased bit of the stage situated thereabove has previously being devalued by writing after "1". The rebooking operation itself is neutral as to value, since devaluation and revaluation offset one another. There is no incitement to fraud by intentionally interrupting the rebooking operation, since the devaluation is undertaken initially. The counter reading of the telephone card can only be reduced from the prescribed initial value through the use of writing and erasing operations, and it is thus difficult to tamper with in principle.

FIGS. 2.1 to 2.3 show an exemplary embodiment of the invention, in which the memory locations of the region, provided for storing the respective value units of the debit card, of the non-volatile memory are divided up into subregions (stages 1 to 5) of different significance (stage values 1, 8, 64, 512, 4096) in each case, with erasure of the memory locations being possible simultaneously only for all of the memory locations of a subregion of specific significance, and with each subregion being capable of erasure only after a carry value has been written into a previously empty memory location of the subregion of the next highest significance. According to the invention, the value units of at least the memory locations of the most significant subregion (stage 5) in a release register of the debit card are assigned release values to be stored, which represent either a release state ("0") or a blocking state ("1") for the respectively assigned value state of the memory locations of the at least most significant subregion, and raising the card value of the debit card is possible only by changing a release value, assigned to the value state of a memory location, from the blocking state into a release state. In the numerical example according to FIGS. 2.1 to 2.3, when initializing a $100.00 card (=10,000 value units), for example, an appropriate counter reading is set (10,000=2*4096+3*512+4*64+ 2*8). Of the 8 written bits in the value counter of the uppermost stage 5, only 2 bits are released in the release register on the basis of the written bits. As will be explained in more detail below, there is no change to the basic counting principle of the previously known telephone cards in the rechargeable debit card. The uppermost counting stage 5 of the value counter again controls the charging of the neighboring stage 4, etc. as a PROM. However, within the value counter it is now given the additional function of a control region for recharging. Recharging is understood below as the release of one or more memory bits in the control region for the purpose of erasing the value stage 4 situated therebelow. The size of the control region limits the sum of all of the payment operations permitted for the card, including charging. In the exemplary embodiment, with a size of 10 bits, a total of at most 10*4096=40960 value units, or over $400.00, can be recharged, for example. Should an extended monetary application including charging require more counting units, the control region can also be constructed as an additional, most significant sixth counter stage. The cumulated counting range then rises to over 300,000. Moreover, for money, a structure of the security counter other than that of the octal counter described herein also comes into consideration.

The control region in the value counter, that is to say the uppermost stage 5 of the value counter, is assigned or preceded by an identically constructed duplicate as a release register. It is only after the assigned bit has been written in the release register that a bit can be written in the control region, and thus a monetary value to be recharged can be consumed. The charging operation of the debit card in a charging terminal includes writing operations for one or more bits in the release register for the purpose of releasing the assigned bits in the control counter region. Charging is therefore performed in fixed steps, or multiples thereof, in accordance with the value of the value stage 4 which is situated directly therebelow and is to be erased. The owner of the debit card is respectively debited with the assigned monetary value when the release bits are written.

A specific numerical example for charging the debit card through the use of a release accompanied by a rebooking of fixed amounts in accordance with FIGS. 2.1 to 2.3 is explained below. The control region of the value counter is raised from 8 to 10 bits in the example for the purpose of raising the cumulated counting range. The assigned release region is represented on the right next to the control region. FIG. 2.1 shows the state of the value memory and release register for the issue of the debit card with 10,000 value units. These value units are composed of two portions or fractions: a portion or fraction of 2*4096 units which are released in the control region of the value counter by the two written bits in the release register, and a portion or fraction of 1808 units, which are distributed over the value stages 2, 3 and 4 through the state "1" in the value counter (=3*512+ 4*64+2*8).

FIG. 2.2 shows the same card after the card value has been reduced to a residual value of 50 units (corresponding to 50 cents) (6*8+2). During the charging operation, two further bits are written in the release register and thus released in the control region 5 of the value counter. The value of the debit card bas thus been raised to 2*4096+50=8242 units. Charging the card by releasing and rebooking freely selectable amounts, as well as value adjustment in the value counter of the debit card, are carried out as follows. In this case, one feature of the previously described charging concept is that the charging is performed not in freely selectable steps but only in stages in accordance with the value of the second uppermost value stage 4. However, this restriction can be circumvented within certain limits if the value counter itself is also integrated into the charging operation in a tamper-proof manner, as is seen in FIGS. 3.1 to 3.5. If, for example, the last rebooking unit were to raise the value of the value counter beyond the desired charging amount, the difference could be offset before writing the last release bit by writing in the value memory. If the residual value remaining in the value counter does not suffice for this purpose, a rebooking operation which is neutral as to value can also be carried out in the value counter through the point-of-sale terminal by using the already released bits in the control region.

Value adjustment during charging by writing in the value counter does not represent a risk of fraud if it takes place before writing of the last release bit. If a thief were to deliberately interrupt or suppress the operation during the writing phase, he or she would thereby have only a loss in value due to the missing amount of the release bit. Possible tampering by suppressing the adjustment data to be written into the value counter can be detected by the terminal when the value counter is checked once again before the concluding release of the last release bit. The debit chip with its current value counter reading is authenticated by the charging terminal by mutual authentication before the release of the last bit. The correct chip response is thus also a signature of the current counter reading. If this response is false, the writing operation can be suppressed in the release register. A thief would then have to bear only a loss in value.

A specific numerical example for the card with charging and rebooking of freely selectable amounts is explained below. FIG. 3.1 shows the state of the debit card of FIGS. 2.1 to 2.3 with a residual value of 50 units. This card is to be charged in a tamperproof manner by 10,000 units or $100.00 in the case of adoption of the residual value. Three bits in the release register would mean a rise in value by 3*4096= 12288, that is to say 2288 units too many. Without the possibility of fraud, 2*4096 units are firstly released through the release register, and the card value is thus raised to 8242 including the residual value (FIG. 3.2). The next step is for the overpayment portion or fraction of 2288=2*512+3*64+ 6*8 units to be subtracted from the value counter before release of the 3rd bit in the release register. This operation includes two steps in the specified example. In the first step, one of the released bits is employed in a neutral manner as to value for the purpose of recharging the value stages 4 and 3 (FIG. 3.3). The overpayment fraction is debited in the second step from the now filled value counter stages. In this case, the card value provisionally reverts to 5952 units (FIG. 3.4). The debit card reaches the prescribed desired value of 10050 units, and the charging operation is concluded, only after the writing of the 3rd release bit.

I claim:

1. A method for recharging an electronic debit card for cashless clearing transactions, which comprises:
    providing an integrated semiconductor circuit device with at least one address and control logic circuit and a non-volatile memory;
    providing the non-volatile memory with at least one erasable part and a region with memory locations for storing respective debit card value units, each divided into subregions of different significance;
    simultaneously erasing the memory locations only for all of the memory locations of a subregion of specific significance;
    erasing each subregion only after writing a carry value into a previously empty memory location of a subregion of next highest significance;
    assigning release values to be stored to the value units of at least the memory locations of the most significant subregion in a debit card release register;
    representing with the release values one of a release state and a blocking state for a respectively assigned value unit of the memory locations of the at least most significant subregion; and
    raising a total value of the debit card only by changing the release value assigned to the value unit of a memory location, from the blocking state into the release state.

2. The method according to claim 1, which comprises using a release of an assigned value unit, rendered possible on a basis of a release value written in the release register, in the subregion of the memory locations of a specific significance, to erase the subregion of the next lowest significance.

3. The method according to claim 1, which comprises recharging the debit card by a writing operation for at least one release value in the release register, for releasing the assigned value units in a subregion of the memory.

4. The method according to claim 1, which comprises permitting writing of a value unit in a subregion of the memory and consumption of a monetary value to be recharged, only after an assigned release value has been written in the release register.

5. The method according to claim 1, which comprises charging the debit card in a charging terminal in predetermined increments or multiples thereof in accordance with the significance of the subregion being disposed directly therebelow with reference to the most significant subregion and to be erased.

6. The method according to claim 1, which comprises providing the security-relevant charging operation of the debit card with only value-diminishing writing operations or rebookings being neutral as to value, and undertaking an authenticity check of the debit card in the charging terminal before a value unit is released.

7. The method according to claim 1, which comprises writing an additional non-volatile backup bit in a memory location inside the debit card at the same time as a release value.

8. The method according to claim 7, which comprises resetting the additional non-volatile backup bit through the charging terminal after termination of a devaluation operation by a security procedure similar to that during writing of a release value.

9. An electronic debit card for cashless clearing transactions, comprising:
    an integrated semiconductor circuit device including at least one address and control logic circuit and a non-volatile memory;
    said non-volatile memory having at least one erasable part, and said non-volatile memory having a region with memory locations for storing a respective devaluation state of the debit card, each divided into subregions of different significance;
    said memory locations capable of simultaneous erasure only for all of said memory locations of one of said subregions of specific significance;
    each subregion capable of erasure only after writing a carry value into a previously empty memory cell of said subregion of next highest significance;
    at least said memory locations of the most significant subregion in a release register having value units assigned release values to be stored;
    said release values representing one of a release state and a blocking state for said respectively assigned value unit of said memory locations of said at least most significant subregion; and
    said semiconductor circuit device permitting a total value of the debit card to be raised only by changing said release value assigned to said value unit of a memory location, from said blocking state into said release state.

10. The debit card according to claim 9, including a substantially identically constructed duplicate of said release register associated with said memory locations at least of said most significant subregion of said memory.

11. The debit card according to claim 9, including a substantially identically constructed duplicate of said release register connected upstream of said memory locations at least of said most significant subregion of said memory.

12. The debit card according to claim 9, wherein an amount of said memory locations of said most significant subregion of said memory limits a sum of all payment operations, including chargings, permitted for the debit card.

13. The debit card according to claim 9, wherein at least said region of said non-volatile memory for storing said respective devaluation state of the debit card is a multistage counter.

14. The debit card according to claim 13, wherein said multistage counter is an octal counter.

15. The debit card according to claim 9, wherein at least said region of said non-volatile memory for storing said respective devaluation state of the debit card has an electrically erasable read-only memory.

* * * * *